United States Patent
Garcia Tellez (10) Patent No.: US 11,269,853 B2
(45) Date of Patent: *Mar. 8, 2022

(54) USER DEFINED HEURISTIC REFRESH OF A MATERIALIZED QUERY TABLE

(71) Applicant: International Business Machines Corporation, Armonk, NY (US)

(72) Inventor: Edgar M. Garcia Tellez, Ampliacion Granada (MX)

(73) Assignee: International Business Machines Corporation, Armonk, NY (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/686,258

(22) Filed: Nov. 18, 2019

(65) Prior Publication Data
US 2020/0081881 A1 Mar. 12, 2020

Related U.S. Application Data

(63) Continuation of application No. 15/613,462, filed on Jun. 5, 2017, now Pat. No. 10,621,161.

(51) Int. Cl.
*G06F 16/00* (2019.01)
*G06F 16/23* (2019.01)
*G06F 16/22* (2019.01)

(52) U.S. Cl.
CPC ...... *G06F 16/2365* (2019.01); *G06F 16/2282* (2019.01); *G06F 16/23* (2019.01); *G06F 16/2393* (2019.01)

(58) Field of Classification Search
CPC .. G06F 16/2365; G06F 16/23; G06F 16/2282; G06F 16/2393
See application file for complete search history.

(56) References Cited

U.S. PATENT DOCUMENTS 7,111,020 B1 * 9/2006 Gupta ............... G06F 16/24539
7,185,004 B1 * 2/2007 Simmen ........... G06F 16/24539
(Continued)

OTHER PUBLICATIONS

Colby et al., "Algorithms for Deferred View Maintenance," SIGMOD '96 Proceedings of the 1996 ACM SIGMOD International Conference on Management of Data, 1996, New York, New York, 12 pages, Copyright 1996 ACM.
(Continued)

*Primary Examiner* — Khanh B Pham
(74) *Attorney, Agent, or Firm* — Jared C. Chaney (57) ABSTRACT

A method, system and computer program product for operating a database includes: receiving a query including a first component indicating a criteria for generating a materialized query table (MQT) from the database and a second component having a condition for generating a reference value indicating a state of one or more items in the database; generating the MQT from the database where the MQT includes data items satisfying the criteria; generating, by executing the second component in response to receiving the query, a first reference value; receiving, subsequent to generating the first reference value, a second query for retrieving a data item from the MQT; generating, by executing the second component in response to receiving the second query, a second reference value; determining whether the first and second reference values are equal; and updating the MQT when the first reference value is not equal to the second reference value.

16 Claims, 5 Drawing Sheets

(56) References Cited

U.S. PATENT DOCUMENTS

| | | |
|---|---|---|
| 7,395,258 B2 | 7/2008 | Altinel et al. |
| 7,930,297 B2 | 4/2011 | Yu et al. |
| 7,962,481 B2 | 6/2011 | Ganesh et al. |
| 8,468,152 B2 | 6/2013 | Santosuosso |
| 10,055,447 B1 | 8/2018 | Garcia Tellez |
| 2006/0122964 A1 | 6/2006 | Yu et al. |
| 2007/0073657 A1 | 3/2007 | Santosuosso |
| 2009/0018991 A1 | 1/2009 | Thiyagarajan et al. |
| 2009/0037489 A1* | 2/2009 | Grundler ............... G06Q 10/10 |
| 2010/0332526 A1 | 12/2010 | Nori et al. |
| 2011/0137875 A1 | 6/2011 | Ziauddin et al. |
| 2013/0006664 A1 | 1/2013 | Chliparambil et al. |
| 2013/0159284 A1 | 6/2013 | Santosuosso |
| 2013/0332487 A1 | 12/2013 | Ramesh et al. |
| 2014/0280028 A1 | 9/2014 | Ding et al. |
| 2016/0171070 A1 | 6/2016 | Hrle et al. |
| 2016/0217183 A1 | 7/2016 | Konik et al. |
| 2018/0349431 A1 | 12/2018 | Garcia Tellez |

OTHER PUBLICATIONS

Edgar M. Garcia Tellez, "User Defined Heuristic Refresh of a Materialized Query Table," U.S. Appl. No. 15/613,462, filed Jun. 5, 2017.

Edgar M. Garcia Tellez, "User Defined Heuristic Refresh of a Materialized Query Table," U.S. Appl. No. 15/704,264, filed Sep. 14, 2017.

Accelerated Examination Support Document, Dated Sep. 5, 2017, 25 pages.

List of Patents or Patent Publications Treated as Related, Dated Nov. 13, 2019, 2 pages.

\* cited by examiner

FIG. 1

```
>>-CREATE TABLE--table-name------------------------------------>

|--+-----------------------+--AS--(--fullselect--)-------------->
   |    .-,----------.     |
   |    V          . |     |
   '-(----column-name-+--)-'
>--| materialized-query-table-options |------------------------| materialized-query-table-options

|--+-WITH NO DATA--+------------------+-+---------------------|
   |               '-| copy-options |-' |
   '-| refreshable-table-options |------' refreshable-table-options

|--●--DATA INITIALLY DEFERRED--●--REFRESH--+-DEFERRED--+--●----->
                                           '-IMMEDIATE-'
   .-ENABLE QUERY OPTIMIZATION--.
>--+----------------------------+--●--------------------------->
   '-DISABLE QUERY OPTIMIZATION-'
>--+---------------------------------+--●--------------------|
   '-MAINTAINED BY--+-SYSTEM---------+-'
                   +-USER [WITH HFC ('- select_hfc -')] ---------+
                   '-FEDERATED_TOOL-'
```

FIG. 2

```
CREATE TABLE catalog_view
AS (SELECT p.sku, p.description, p.price
      FROM product p, inventory i
     WHERE p.sku=i.sku
       AND i.warehouse_id=1
       AND i.qty>0)
MAINTAINED BY USER WITH HFC (SELECT count(sku)
                               FROM inventory
                              WHERE qty>0)
```

USER DEFINED HEURISTIC REFRESH OF A MATERIALIZED QUERY TABLE

BACKGROUND

The present disclosure relates to database systems, and more specifically, to accessing data in a materialized query table.

Database systems allow for the structured storage and retrieval of large volumes of data. These systems typically include physical databases and database management system applications engineered to manage the storage of, and access to, data in the physical databases. Client applications generally access data stored in physical databases by executing a query against the database management system. These queries typically include predicate expressions and conditionals for logically selecting sets of related data in the physical databases.

The physical databases store data in large files on one or more storage volumes. The large files may be organized into tables that are structured according to, inter alia, the types of data stored in the physical databases and according to models or processes reflecting the types of queries that may be executed on the database to access the stored data.

SUMMARY

According to embodiments of the present disclosure, a method for operating a database includes receiving a first query including a first component indicating a criteria for generating a materialized query table from the database and a second component having a condition for generating a reference value indicating a state of one or more items in the database. The method further includes generating, by executing the first component in response to receiving the query, the materialized query table from the database where the materialized query table includes a set of one or more data items (set of data items) satisfying the criteria. The method further includes generating, by executing the second component in response to receiving the query, a first reference value. The method further includes receiving, subsequent to generating the first reference value, a second query for retrieving a data item from the set of data items. The method further includes generating, by executing the second component in response to receiving the second query, a second reference value. The method further includes determining whether the first reference value is equal to the second reference value. The method additionally includes updating the materialized query table when the first reference value is not equal to the second reference value.

Other embodiments are directed towards systems and computer program products for operating a database.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to database systems, more particular aspects relate to accessing data in a materialized query table. While the present disclosure is not necessarily limited to such applications, various aspects of the disclosure may be appreciated through a discussion of various examples using this context.

A query executed against a database management system may cause the database management system to execute logical operations involving one or more tables of a physical database to retrieve a set (e.g., one or more) of data items matching predicates specified in the query. Some database management systems may copy the set of data items matching the query from tables in the physical database (e.g., base tables) and store them in a new table. A materialized query table (MQT), for example, is a table that stores a result (e.g., sets of data items or datasets) of a SELECT query over one or more tables in a physical database. An MQT may be populated by copying data from one or more base tables and merging them into a new table. The MQT may thus provide a snapshot of the selected data items stored in a physical database. Once the MQT is populated, the stored data items may be accessed by executing a query against the MQT instead of running a new query against that entire physical database. The MQT thus additionally serves as a cache for certain queries (e.g., complex queries whose execution may otherwise consume valuable computing resources). When data items matching a query are found in an MQT, executing the query against the MQT, rather than against the physical database, may reduce the amount of computing resources needed to satisfy the query. Consequently, MQTs can significantly improve the efficiency or performance of database management systems when servicing queries. To realize this benefit, however, MQTs may be refreshed at certain times to update the cached data items. Materialized query tables, for example, may be updated when there is a change to base tables in a physical database that modifies are result of the query that generated the MQT or modifies items in the physical database that have corresponding copies in the MQT.

Embodiments of this disclosure are based on the present recognition that while updating (e.g., refreshing) a materialized query table can be costly, a balance may be found between update requirements and update frequency. Updating an MQT, for example, at a frequency based on a fixed period carries the risk that a database management system may respond to a query against the MQT with stale (e.g., non-fresh or out of date) data. Additionally, an update algorithm that updates and MQT based on a fixed period carries the risk of wasting computing resources by updating an MQT when the physical database has not changed and manner that affects the MQT (e.g., when a change to the physical database does not affect data items stored the MQT).

An on demand updating algorithm may eschew these limitations. One example of an on demand updating algorithm tracks any changes to the physical database (e.g., changes to base tables) that impact data items stored in an MQT and completely or partially updates the content of the MQT immediately or at a deferred time. This algorithm works work well when any change to the physical data base causes an MQT to be considered stale. This is the case for system generated tables (e.g., base tables or MQTs containing information or metadata about the internals of a physical database or database system) where changes to system information may trigger updates to an MQT. This on demand update algorithm, however, may not work well when an MQT is populated with user defined data (e.g., the base tables from which a MQT was generated store user defined data). When an MQT stores user defined data, different changes to the base tables may have different impacts on determining whether the MQT should be updated. Some updates to a base table associated with an MQT, for example, may not require updating the MQT.

Embodiments of the present disclosure provide methods, systems, and computer program products for using user defined heuristic freshness conditions (hereinafter, HFCs) to determine whether to update MQTs. An HFC is a low cost query (hereinafter, HFC query) including a set of user defined conditions for triggering an MQT update. An HFC may be executed (e.g., evaluated) by a database management system each time a query is executed against an MQT. The database management system may return a data items satisfying the query when a result of executing the HFC query indicates that the MQT is up-to-date. Alternatively, the database management system may update the MQT (e.g., add data items to, or remove data items from, the MQT) before returning the data items satisfying the query when a result of executing the HFC query indicates that the MQT is not up-to-date. Embodiments of the present disclosure thus ensures that the MQT is only updated according to specific user defined conditions as specified by the HFC.

As used herein, an HFC query is low cost query that, when executed, generates a reference value that may be used to determine whether to update an MQT. A low cost query may be a query against a set of database table whose execution requires a nominal or minimal amount of computing resources to execute. A low cost query, for example may be a query that references only one column of one table in a physical database. A low cost query may also be a query whose execution uses fewer computing resources than the execution of a user generated query against a database management system. According to various embodiments, an HFC query associated with an MQT may be a low cost query that requires fewer computing resources to execute than executing a full or partial MQT update.

A reference value generated from executing an HFC query may be any data value generated in response to executing the query against one or more tables in a physical database. A reference value, for example, may be a binary result of a logical expression or statistic derived from data items matching a predicate specified in an HFC query.

According to various embodiments, an MQT may be refreshed according a set of specific user defined conditions by specifying an HFC having the set of user defined conditions in a query that generated the MQT. In some embodiments, the syntax for a query language command or statement for defining a materialized query table may be extended to enable the definition of an HFC query as a low cost query that produces a reference value, as described herein. The syntax for defining an SQL CREATE TABLE command, for example, may be extended by modifying the command's MAINTAINED BY USER option to include a new "WITH HFC" parameter. The new WITH HFC parameter may enable an HFC query to be specified as an SQL SELECT statement. A benefit of this approach is that both a first query for generating an MQT and a second low cost query for defining an HFC query can be specified using SQL statements familiar to developers/users.

According to various embodiments, the performance of database management systems may be improved by using an HFC query to determine when to update a materialized query table. Using an HFC, an MQT may be updated according to user specified conditions. The user specified condition may be determined based on a user's domain knowledge about data items stored in an MQT. Consequently, an MQT may be updated when a change to a base table of physical database results an MQT being modified in manner specified by a user.

Figure 1:
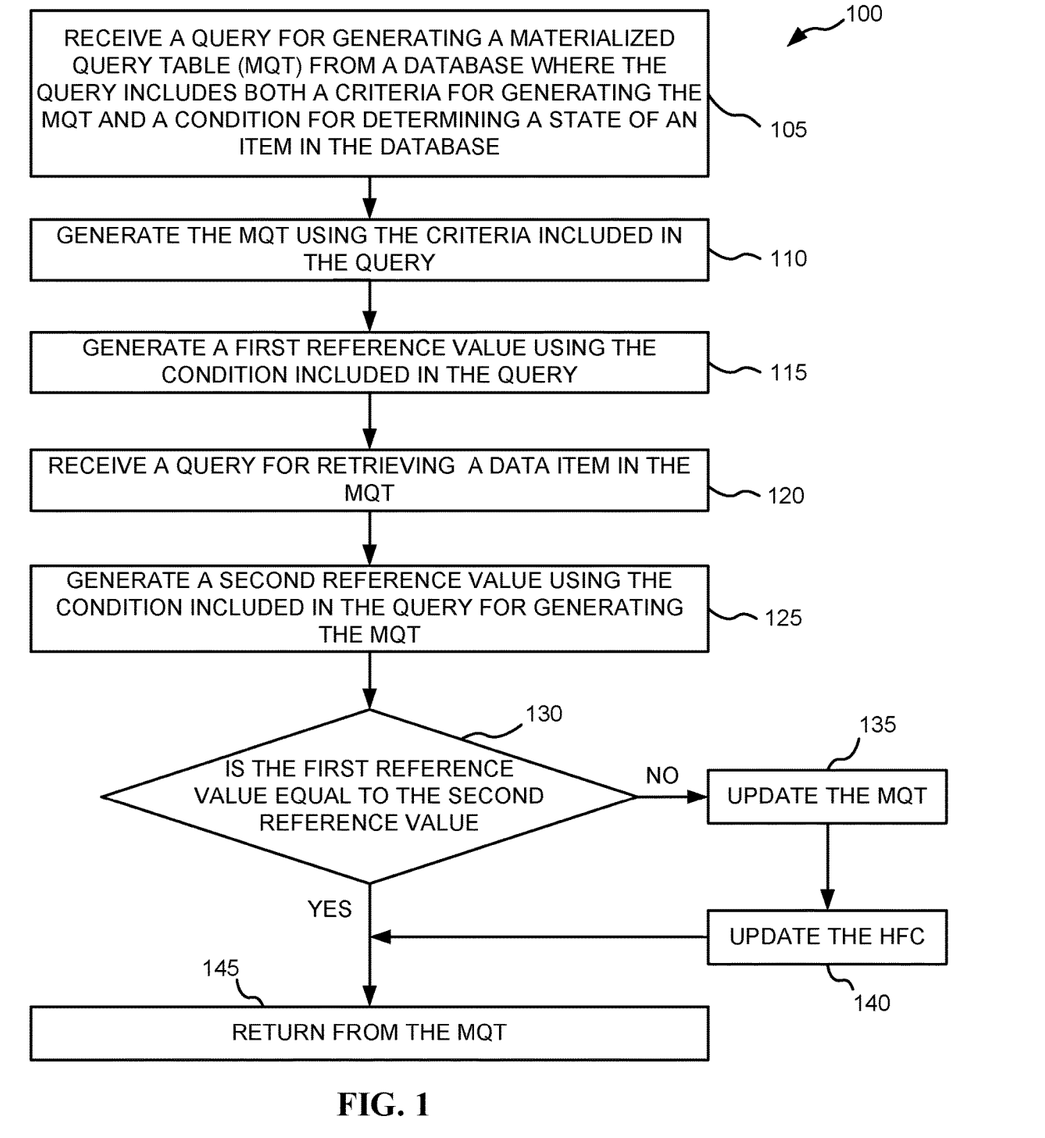
FIG. 1 depicts a flowchart of an example embodiment of computer implemented operations for accessing data in a materialized query table, according to various embodiments.
Figure 4:
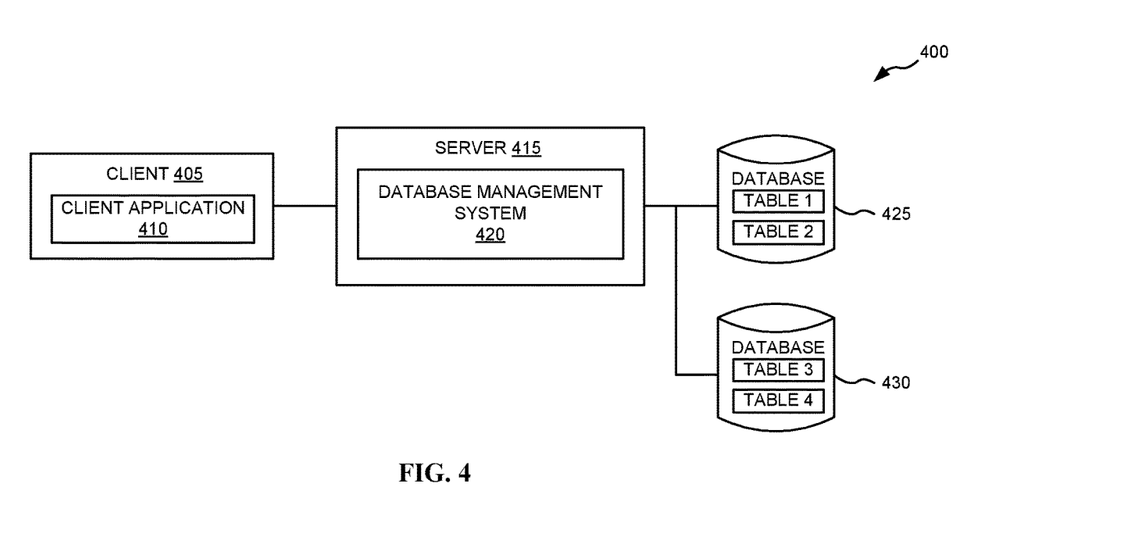
FIG. 4 depicts a block diagram of an example system for accessing data in a materialized query table, according to various embodiments.

Referring now to the figures, FIG. 1 depicts a flowchart 100 of a set of operations for accessing data in a materialized query table, according to various embodiments. The operations of flowchart 100 may be executed by a database system configured to manage the storing of, and the access to, data items in a physical database. In some embodiments, the operations of flowchart 100 may be executed by a software application such as the database management system, such as the database management system 420 (FIG. 4) executing the server 415 (FIG. 4). According to various embodiments, the operations of flowchart 100 may be executed by one or more electronic circuits associated with a database management system.

Prior to executing the operations of flowchart 100, a database management system may be configured enable the use of a user defined heuristic freshness condition by extending the syntax of a query language statement or command for defining an MQT, as described herein.

The database management system may execute operation 105 to receive a query for generating an MQT. The query (e.g., a first query) may be defined according to a prescribed query language syntax for defining an MQT and an associated HFC query, as described herein. The query may include both a first component for selecting a set of data items from a physical database associated with the database management system and a second component for specifying an HFC query. The first component may include a predicate and a set of logical operations (hereinafter, "criteria") for selecting and retrieving a set of data items from one or more base tables in a physical database. In embodiments where the received query is generated using SQL, the received query may be a CREATE TABLE command and the first component of the received query may be a SELECT statement associated with the CREATE TABLE command.

The second component of the query may be an HFC query including a set of user defined conditions for determining when to update the MQT. The HFC query, including the set of user defined conditions, may be specified as a low cost user defined query. In embodiments where the received query is generated using SQL and includes a CREATE TABLE query language command, the second component of the received query may be specified as a second SELECT statement generated within an option field (e.g., an extended operation field, as described herein) of the CREATE TABLE command.

The database management system may execute operation 110 to generate an MQT using a query received in operation 105. In some embodiments, operation 110 may be executed automatically in response to receiving the query in operation 105. Executing the operation 110 may include executing a first component of the received query to select a set of data items from one or more base tables in a physical database. The database management system may then store a copy of the selected set of data items in an MQT.

The database management system may execute operation 115 to generate a reference value (e.g., a first reference value) using the query received in operation 105. In some embodiments, operation 115 may be executed automatically in response to receiving the query in operation 105. Executing the operation 115 may include executing a second component of the received query to evaluate a set of user defined conditions to generate a reference value determined by a state of one or more data items in the physical database. In some embodiments, the one or more data items may be stored in, or selected from, one or more of the same base tables in the physical database from which the set of data items stored in the MQT was selected. In certain embodiments, the reference value may be stored in a new database table.

The database management system may execute operation 120 to receive a query (e.g., a second query) for retrieving a data item from an MQT. The received query may be generated using a query language command or statement for selecting a data item from the set of data items stored in the MQT. In some embodiments, the received query may be generated using SQL and may include a SELECT statement indicating the MQT as a source table (e.g., a table to execute the SELECT operation against). In other embodiments, the received query may be generated using SQL and a SELECT statement indicating one more base tables. In these embodiments, an optimizer component of the database management system may determine that the requested data item can be retrieved from the MQT. The optimizer component may rewrite the query, based on this determination, to cause the database management system to retrieve the data item from the MQT.

The database management system may execute operation 125 to generate a second reference value. The second reference value may be generated automatically by the database management system in response to receiving the query in operation 120. According to various embodiments, the second reference value may be generated by executing the HFC query included in the second component of the query received in operation 105, as described herein. The second reference value may indicate a state of the same one or more data items used to determine the first reference value in operation 115.

At operation 130, the database management system may determine whether the first reference value is equal to, or is the same as, the second reference value. In some embodiments, the first reference value may be equal to the second reference value when the base tables that stored the data items used to generate the MQT in operation 110 were not modified between the execution of operation 115 and the execution of operation 125. In certain embodiments, the first reference value may be equal to the second reference value even though the base tables that stored the data items used to generate the MQT in operation 110 were modified between the execution of operation 115 and the execution of operation 125 if the modification to the base tables did not sufficiently change the data stored in the MQT to warrant updating the MQT, as specified by the HFC query.

In some embodiments, the first reference value may not be equal to the second reference value when a change to the physical database requires an update to the MQT, as indicated by HFC query associated with the MQT.

The database management system may execute operation 145 and return the data item requested in operation 120 when the first reference value is equal to the second reference value.

At operation 135, the database management system may update the MQT with fresh data from the physical database when the first reference value is not equal to the second reference value. Updating an MQT may include, inter alia, adding items to, or removing items, the MQT.

At operation 140, the database management system may update the first reference value. In some embodiments, updating the first reference value may include replacing the first reference value with the second reference value. In other embodiments, updating the first reference value may include replacing the first reference value with new reference value generated by executing the HFC query associated with the MQT. The database management system may then execution operation 145 and return the data item requested in operation 120 from the updated MQT.

Figure 2:
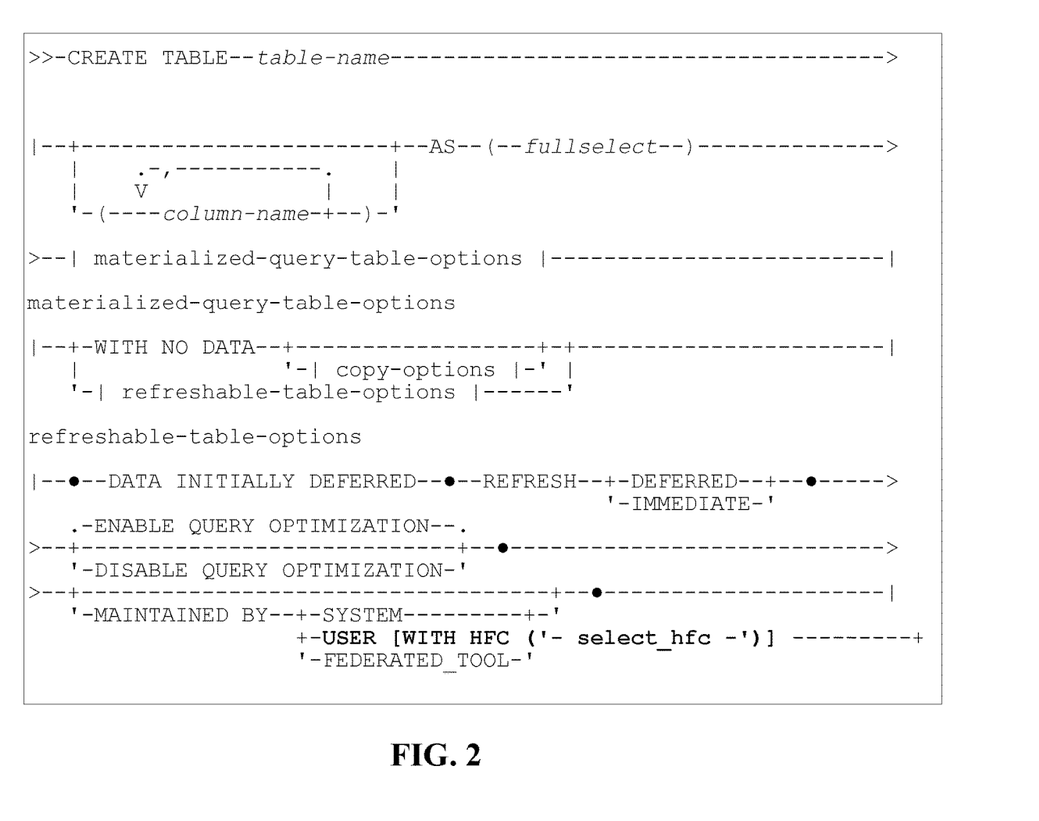
FIG. 2 depicts example query language syntax for defining a materialized query including a user defined heuristic condition, according to various embodiments.

FIG. 2 depicts example query language syntax for defining a materialized query including a user defined heuristic condition, according to various embodiments. FIG. 2 shows syntax for defining an SQL CREATE TABLE command extended to accommodate the definition of an HFC query. The SQL CREATE TABLE syntax is extended by modifying the MAINTAINED BY USER option to include a new WITH HFC parameter. The WITH HFC parameter includes a select_hfc field for specifying a low cost query as an SQL select statement. Commands or statements for generating materialized query tables in other query languages may be similarly modified or extended to accommodate the specification of an HFC query which is executed when an MQT is generated and each time a query is made against the MQT.

Figure 3:
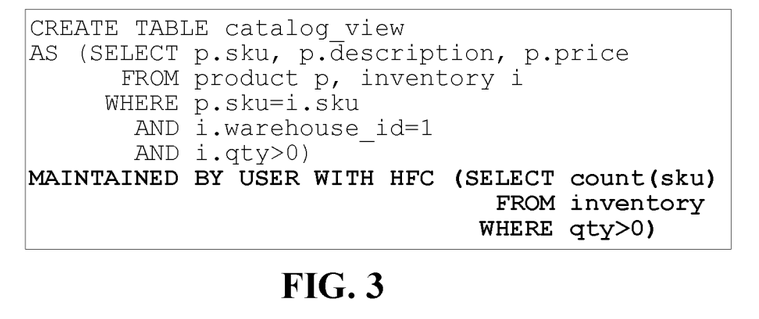
FIG. 3 depicts an example query for generating a materialized query table having an associated user defined heuristic freshness condition query, according to various embodiments.

FIG. 3 depicts an example query for generating a materialized query table having an associated user defined heuristic freshness condition query, according to various embodiments. The example query is written using an SQL CREATE TABLE command that is modified or extended as described in the discussion of FIG. 2. The example query includes a join query for generating an MQT and an HFC query (e.g., a low cost query). The join query, for example, generates an MQT using all products with physical inventory in a warehouse by joining a product base table and an inventory base table. The HFC query is specified using the MAINTAINED BY USER WITH HFC option and includes a select operation which defines an HFC as a count of products with inventory, using only the inventory base table. The HFC query defined in this example operates on one base table (e.g., inventory) and includes only one conditional, while the join query used to generate the MQT operates on two base tables (e.g., product and inventory) and includes three conditionals. In some embodiments, the simpler HFC query may require fewer computing resources to execute than the more complicated join query. Executing the join query, for example, may use a first quantity of computing resources and executing the HFC query may use a second quantity of computing resources, such that the second quantity is less than the first quantity.

Executing the HFC query in FIG. 3 generates a reference value that is a count of products in the inventory base table. In some embodiments, the HFC query is executed each time a query against the database system tries to retrieve information from the catalog_view MQT. Consequently, the catalog_view MQT may be updated to add or delete products in response to the inventory level of a product falls to zero (e.g., reflecting sales) or rises above zero (e.g., reflecting addition of products to the warehouse).

FIG. 4 depicts a block diagram of an example system for accessing data in a materialized query table, according to various embodiments. The system includes a client computing device 405, a server computing device 415, and a physical database 425 and 430. In some embodiments, the client computing device 405, the server computing device 415 and the physical database 425 and 430 may be coupled together by, or may communicate via, one or more wired or wireless network communication devices (e.g., a modem, radio, or network interface card). In certain embodiments, one or more of the client computing device 405, the server computing device 415 and the physical database 425 and 430 may be embodied in a single computing device.

The client computing device 405 may be computing system, such as the computing system 500 (FIG. 5), configured execute a client application 410 (e.g., a software application or computer program). The client application 410 may be a database client configured to generate queries against, and retrieve data items from, a database management system 420.

The server computing device 415 may be computing system, such as the computing system 500 (FIG. 5), configured to execute the database management system 420. The database management system 420 may be a software application configured to service (e.g., execute and respond to) queries generated by the client application 410. In some embodiments, the database management system 420 may be further configured to manage the allocation and storage of data items the physical database 425 and 430. The database management system 420 may be further configured to execute the operations of the present disclosure as described in reference to FIGS. 1-4.

The physical database 425 and 430 may be an array of storage volumes configured to store heterogeneous data items in, for example, a relational database. A relational database may include one or more tables (e.g., Table 1-4) for storing related data. In some embodiments, the physical database 425 and 430 may further include a computing system, such as the computing system 500 (FIG. 5) configured to manage the physical storage of data items on the array of storage volumes.

Figure 5:
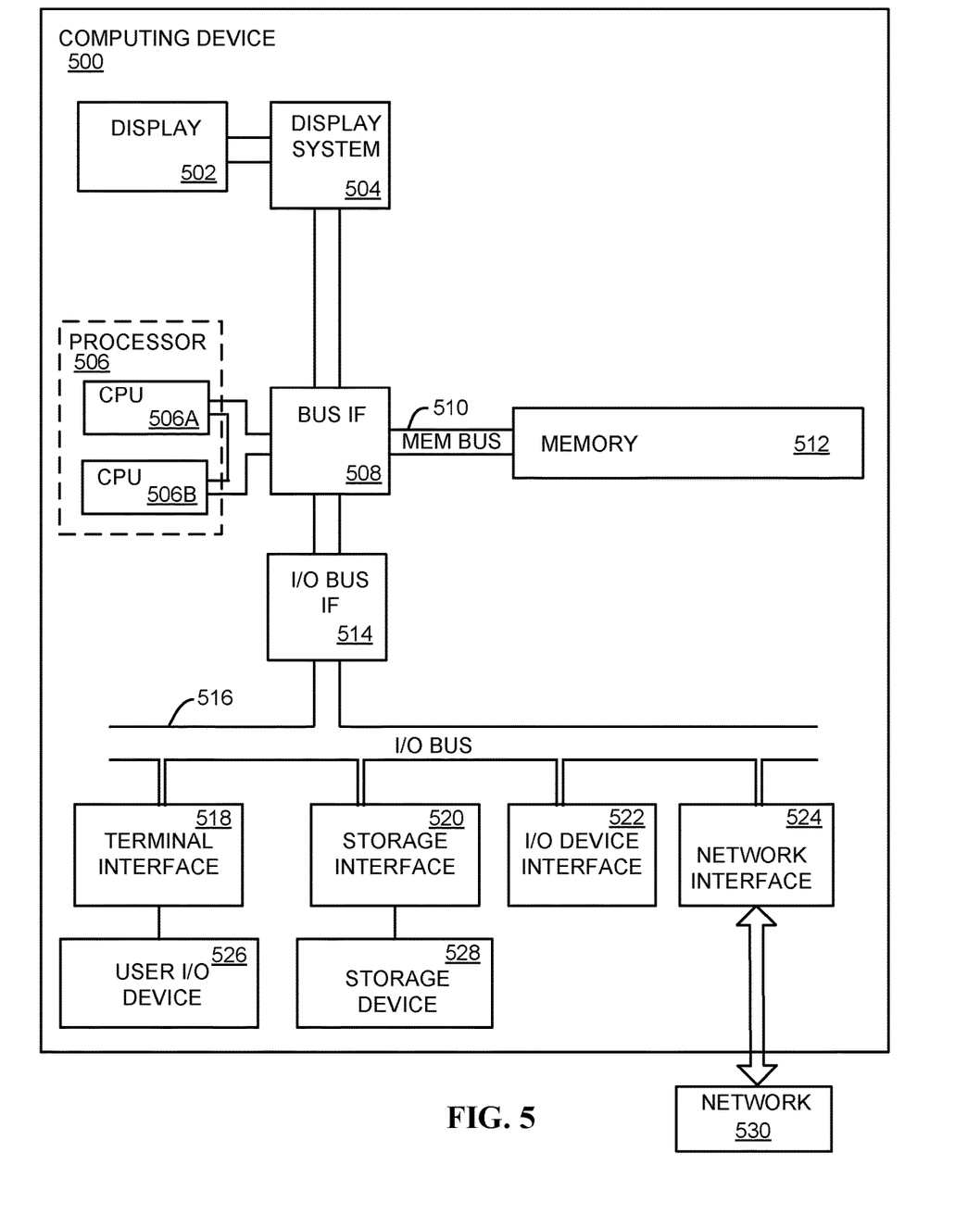
FIG. 5 depicts a block diagram of a computer system for accessing data in a materialized query table, according to various embodiments.

FIG. 5 depicts a block diagram of a computer system 500 for accessing data in a materialized query table, according to various embodiments. The computing device 500 may be a node (e.g., a service node or an execution system) of a cluster computing system configured to execute the operations described herein The components of the computing device 500 can include one or more processors 506, a memory 512, a terminal interface 518, a storage interface 520, an Input/Output ("I/O") device interface 522, and a network interface 524, all of which are communicatively coupled, directly or indirectly, for inter-component communication via a memory bus 510, an I/O bus 516, bus interface unit ("IF") 508, and an I/O bus interface unit 514.

The computing device 500 may include one or more general-purpose programmable central processing units (CPUs) 506A and 506B, herein generically referred to as the processor 506. In an embodiment, the computing device 500 may contain multiple processors; however, in another embodiment, the computing device 500 may alternatively be a single CPU device. Each processor 506 executes instructions stored in the memory 512.

The computing device 500 may include a bus interface unit 508 to handle communications among the processor 506, the memory 512, the display system 504, and the I/O bus interface unit 514. The I/O bus interface unit 514 may be coupled with the I/O bus 516 for transferring data to and from the various I/O units. The I/O bus interface unit 514 may communicate with multiple I/O interface units 518, 520, 522, and 524, which are also known as I/O processors (IOPs) or I/O adapters (IOAs), through the I/O bus 516. The display system 504 may include a display controller, a display memory, or both. The display controller may provide video, audio, or both types of data to a display device 502. The display memory may be a dedicated memory for buffering video data. The display system 504 may be coupled with a display device 502, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 504 may be on board an integrated circuit that also includes the processor 506. In addition, one or more of the functions provided by the bus interface unit 508 may be on board an integrated circuit that also includes the processor 506.

The I/O interface units support communication with a variety of storage and I/O devices. For example, the terminal interface unit 518 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 526 and the computing device 500, may receive output data via the user output devices. For example, a user interface may be presented via the user I/O device 526, such as displayed on a display device, played via a speaker, or printed via a printer.

The storage interface 520 supports the attachment of one or more disk drives or direct access storage devices 528 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 528 may be implemented via any type of secondary storage device. The contents of the memory 512, or any portion thereof, may be stored to and retrieved from the storage device 528 as needed. The I/O device interface 522 provides an interface to any of various other I/O devices or devices of other types, such as printers or fax machines. The network interface 524 provides one or more communication paths from the computing device 500 to other digital devices and computer systems.

Although the computing device 500 shown in FIG. 5 illustrates a particular bus structure providing a direct communication path among the processors 506, the memory 512, the bus interface 508, the display system 504, and the I/O bus interface unit 514, in alternative embodiments the computing device 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 514 and the I/O bus 508 are shown as single respective units, the computing device 500, may include multiple I/O bus interface units 514 and/or multiple I/O buses 516. While multiple I/O interface units are shown, which separate the I/O bus 516 from various communication paths running to the various I/O devices, in other embodiments, some or all of the I/O devices are connected directly to one or more system I/O buses.

In various embodiments, the computing device 500 is a multi-user mainframe computer system, a single-user system, or a server computer or similar device that has little or no direct user interface, but receives requests from other computer systems (clients). In other embodiments, the computing device 500 may be implemented as a desktop computer, portable computer, laptop or notebook computer, tablet computer, pocket computer, telephone, smart phone, or any other suitable type of electronic device.

In an embodiment, the memory 512 may include a random-access semiconductor memory, storage device, or storage medium (either volatile or non-volatile) for storing or encoding data and programs. In another embodiment, the memory 512 represents the entire virtual memory of the computing device 500, and may also include the virtual memory of other computer systems coupled to the computing device 500 or connected via a network 530. The memory 512 may be a single monolithic entity, but in other embodiments the memory 512 may include a hierarchy of caches and other memory devices. For example, memory may exist in multiple levels of caches, and these caches may be further divided by function, so that one cache holds instructions while another holds non-instruction data, which is used by the processor. Memory 512 may be further distributed and associated with different CPUs or sets of CPUs, as is known in any various so-called non-uniform memory access (NUMA) computer architectures.

The memory 512 may store all or a portion of the components and data shown in FIG. 1-4. In particular, the memory 512 may store the client application 410, the database management system 420 and one or more materialized query tables. The client application 410 and the database management system 420 may include computer executable code for orchestrating and performing operations of the components and flowcharts described in the discussion of FIGS. 1 and 4. The computer executable code may be executed by processor 506. Some or all of the components and data shown in FIGS. 1-4 may be on different computer systems and may be accessed remotely, e.g., via a network 530. The computing device 500 may use virtual addressing mechanisms that allow the programs of the computing device 500 to behave as if they only have access to a large, single storage entity instead of access to multiple, smaller storage entities. Thus, while the components and data shown in FIGS. 1-4 are illustrated as being included within the memory 512, these components and data are not necessarily all completely contained in the same storage device at the same time. Although the components and data shown in FIG. 1-4 are illustrated as being separate entities, in other embodiments some of them, portions of some of them, or all of them may be packaged together.

In an embodiment, the components and data shown in FIGS. 1-4 may include instructions or statements that execute on the processor 506 or instructions or statements that are interpreted by instructions or statements that execute the processor 506 to carry out the functions as further described below. In another embodiment, the components shown in FIGS. 1-4 may be implemented in hardware via semiconductor devices, chips, logical gates, circuits, circuit cards, and/or other physical hardware devices in lieu of, or in addition to, a processor-based system. In an embodiment, the components shown in FIGS. 1-4 may include data in addition to instructions or statements.

FIG. 5 is intended to depict representative components of the computing device 500. Individual components, however, may have greater complexity than represented in FIG. 5. In FIG. 5, components other than or in addition to those shown may be present, and the number, type, and configuration of such components may vary. Several particular examples of additional complexity or additional variations are disclosed herein; these are by way of example only and are not necessarily the only such variations. The various program components described as being included in FIG. 5 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for operating a database, the method comprising:
   receiving a first query, the first query comprising a first component indicating a criteria for generating a materialized query table from the database, and a second component comprising a condition for generating a reference value indicating a state of one or more items in the database;
   generating, by executing the first component in response to receiving the query, the materialized query table from the database, the materialized query table having a set of one or more data items (set of data items) satisfying the criteria;
   generating, by executing the second component in response to receiving the query, a first reference value;
   receiving, subsequent to generating the first reference value, a second query for retrieving a data item from the set of data items;
   rewriting the second query to retrieve the data item from the materialized query table;
   generating, by executing the second component in response to receiving the second query, a second reference value,
   wherein the first component of the first query is generated using a table generating instruction of a query language, and the second component is generated by modifying a field of table generating instruction to specify the condition for generating the reference value,
      wherein the query language is a Structured Query Language query language,
      wherein the table generating instruction is a CREATE TABLE instruction, wherein the field is a MAINTAINED BY USER field, and wherein the condition is specified using a SELECT statement;

determining whether the first reference value is equal to the second reference value;

updating the materialized query table when the first reference value is not equal to the second reference value; and replacing the first reference value with the second reference value.

2. The method of claim 1, further comprising:

providing, subsequent to the updating, the data item from the updated materialized query table.

3. The method of claim 1, further comprising:

providing the data item from the materialized query table when the first reference value is equal to the second reference value.

4. The method of claim 1, wherein:

executing the first component uses a first quantity of computing resources, and executing the second component uses a second quantity of computing resources, the second quantity of computing resources being less than the first quantity of computing resources.

5. The method of claim 1, wherein the condition comprises a user defined query.

6. The method of claim 5, wherein both the first query and the user defined query are generated using a same query language.

7. The method of claim 1, further comprising:

generating, by executing the second component in response to updating the materialized query table, a third reference value to replace the first reference value.

8. A computer program product operating a database, the computer program product including a computer readable storage medium having program instructions embodied therewith, wherein the computer readable storage medium is not a transitory signal per se, the program instructions executable by a processing circuit to cause the processing circuit to perform a method comprising:

receiving a first query, the first query comprising a first component indicating a criteria for generating a materialized query table from the database, and a second component comprising a condition for generating a reference value indicating a state of one or more items in the database;

generating, by executing the first component in response to receiving the query, the materialized query table from the database, the materialized query table having a set of one or more data items (set of data items) satisfying the criteria;

generating, by executing the second component in response to receiving the query, a first reference value;

receiving, subsequent to generating the first reference value, a second query for retrieving a data item from the set of data items;

rewriting the second query, based on the determining to retrieve the data item from the materialized query table;

generating, by executing the second component in response to receiving the second query, a second reference value, wherein the first component of the first query is generated using a table generating instruction of a query language, and the second component is generated by modifying a field of table generating instruction to specify the condition for generating the reference value, wherein the query language is a Structured Query Language query language, wherein the table generating instruction is a CREATE TABLE instruction, wherein the field is a MAINTAINED BY USER field, and wherein the condition is specified using a SELECT statement;

determining whether the first reference value is equal to the second reference value;

updating the materialized query table when the first reference value is not equal to the second reference value; and replacing the first reference value with the second value.

9. The computer program product of claim 8, the method further comprising:

providing, subsequent to the updating, the data item from the updated materialized query table.

10. The computer program product of claim 8, the method further comprising:

providing the data item from the materialized query table when the first reference value is equal to the second reference value.

11. The computer program product of claim 8, wherein:

executing the first component uses a first quantity of computing resources, and executing the second component uses a second quantity of computing resources, the second quantity of computing resources being less than the first quantity of computing resources.

12. The computer program product of claim 8, wherein the condition comprises a user defined query.

13. The computer program product of claim 8, wherein both the first query and the user defined query are generated using a same query language.

14. The computer program product of claim 8, the method further comprising:

generating, by executing the second component in response to updating the materialized query table, a third reference value to replace the first reference value.

15. A system, comprising:

one or more computing nodes having a memory and a processor; and a computer readable storage medium of the one or more computing nodes having program instructions embodied therewith, the program instructions executable by the processor to cause the system to:

receive a first query, the first query comprising a first component indicating a criteria for generating a materialized query table from the database, and a second component comprising a condition for generating a reference value indicating a state of one or more items in the database;

generate, by executing the first component in response to receiving the query, the materialized query table from the database, the materialized query table having a set of one or more data items (set of data items) satisfying the criteria;

generate, by executing the second component in response to receiving the query, a first reference value, wherein the first component of the first query is generated using a table generating instruction of a query language, and the second component is generated by modifying a field of table generating instruction to specify the condition for generating the reference value, wherein the query language is a Structured Query Language query language, wherein the table generating instruction is a CREATE TABLE instruction, wherein the field is a MAINTAINED BY USER field, and wherein the condition is specified using a SELECT statement;

receive, subsequent to generating the first reference value, a second query for retrieving a data item from the set of data items;

rewrite the second query, based on the determining to retrieve the data item from the materialized query table;

generate, by executing the second component in response to receiving the second query, a second reference value;

determine whether the first reference value is equal to the second reference value;

update the materialized query table when the first reference value is not equal to the second reference value; and replace the first reference value with the second value.

16. The system of claim 15, wherein:

executing the first component uses a first quantity of computing resources, and executing the second component uses a second quantity of computing resources, the second quantity of computing resources being less than the first quantity of computing resources.

* * * * *